United States Patent
Lee et al.

(10) Patent No.: US 10,595,291 B2
(45) Date of Patent: Mar. 17, 2020

(54) METHOD FOR COMMUNICATING USING SYNCHRONIZATION SIGNAL BLOCK IN MOBILE COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Jung Hoon Lee, Daejeon (KR); Cheul Soon Kim, Daejeon (KR); Sung Hyun Moon, Daejeon (KR); Kyoung Seok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/100,379

(22) Filed: Aug. 10, 2018

(65) Prior Publication Data
US 2019/0053176 A1    Feb. 14, 2019

(30) Foreign Application Priority Data

Aug. 10, 2017  (KR) .................. 10-2017-0101428
Jul. 3, 2018    (KR) .................. 10-2018-0077090

(51) Int. Cl.
*H04W 56/00*   (2009.01)
*H04J 11/00*   (2006.01)
(Continued)

(52) U.S. Cl.
CPC ....... *H04W 56/001* (2013.01); *H04J 11/0069* (2013.01); *H04L 5/0048* (2013.01); *H04L 5/0053* (2013.01); *H04L 5/0064* (2013.01); *H04L 5/0092* (2013.01); *H04L 27/2602* (2013.01); *H04W 74/0833* (2013.01); *H04W 76/27* (2018.02); *H04L 5/001* (2013.01);
(Continued)

(58) Field of Classification Search
CPC .......... H04W 56/001; H04W 74/0833; H04W 76/27; H04J 11/0069; H04L 5/0053; H04L 5/001; H04L 5/0064; H04L 5/0092; H04L 5/0048; H04L 27/2602; H04L 5/0023; H04L 5/008; H04L 5/0035
See application file for complete search history.

(56) References Cited

U.S. PATENT DOCUMENTS 9,232,454 B2   1/2016  Lim et al.
9,432,883 B2   8/2016  Jung et al.
(Continued)

FOREIGN PATENT DOCUMENTS

KR   10-2016-0035049 A   3/2016

*Primary Examiner* — Walter J Divito
(74) *Attorney, Agent, or Firm* — LRK PATENT LAW FIRM (57) ABSTRACT

A method and an apparatus for communications using synchronization signal blocks. An operation method of a base station in a mobile communication system includes generating a first synchronization signal/physical broadcast channel (SS/PBCH) block including information indicating whether the first SS/PBCH block is used for initial access of the terminal; and transmitting the generated SS/PBCH block in a first bandwidth part (BP).

10 Claims, 8 Drawing Sheets

(51) Int. Cl.
*H04W 76/27* (2018.01)
*H04L 5/00* (2006.01)
*H04W 74/08* (2009.01)
*H04L 27/26* (2006.01)

(52) U.S. Cl.
CPC ............ *H04L 5/008* (2013.01); *H04L 5/0023* (2013.01); *H04L 5/0035* (2013.01)

(56) References Cited

U.S. PATENT DOCUMENTS

| | | |
|---|---|---|
| 2014/0133294 A1 | 5/2014 | Horn et al. |
| 2014/0313973 A1 | 10/2014 | Park et al. |
| 2015/0351024 A1 | 12/2015 | Jang et al. |
| 2016/0192239 A1 | 6/2016 | Salvador et al. |
| 2017/0208592 A1* | 7/2017 | Rico Alvarino ........ H04W 4/70 |
| 2018/0310262 A1* | 10/2018 | Ly .......................... H04L 5/005 |

* cited by examiner

METHOD FOR COMMUNICATING USING SYNCHRONIZATION SIGNAL BLOCK IN MOBILE COMMUNICATION SYSTEM AND APPARATUS FOR THE SAME

CROSS-REFERENCE TO RELATED APPLICATIONS

This application claims priority to Korean Patent Application Nos. 10-2017-0101428, filed on Aug. 10, 2017, and 10-4018-0077090, filed on Jul. 3, 2018, in the Korean Intellectual Property Office (KIPO), the entire contents of which are hereby incorporated by reference.

BACKGROUND

1. Technical Field

The present disclosure relates to a method and an apparatus for communications in a mobile communication system more specifically, to a method and an apparatus for communications using multiple synchronization signal blocks.

2. Description of Related Art

A fifth generation (5G) mobile communication aiming at giga bps (Gbps) class support of at least 10 to 100 times data transmission rate than a fourth generation (4G) mobile communication may use not only existing mobile communication frequency bands but also several tens giga Hertz (GHz) frequency band. For example, implementation is being discussed in 20 GHz to 60 GHz frequency bands (the wavelength at 30 GHz is 10 mm). The fifth generation mobile communication technology may also be referred to as a millimeter wave mobile communication technology since the wavelengths in frequency bands higher or lower than the frequency of 30 GHz are also expressed in millimeters. The 5G mobile communication may support a massive machine type communication (mMTC) and a ultra-reliable low latency communication (URLLC) for support of Internet of things as well as support of enhanced mobile broadband (eMBB).

Also, the 5G mobile communication system aims at support of a broadband bandwidth from 5 MHz to 400 MHz and support of various subcarrier spacings (e.g., 30 kHz, 60 kHz, 120 kHz, or the like which is a multiple of 15 kHz), unlike the conventional 20 MHz maximum bandwidth and the 15 kHz single subcarrier spacing. As described above, since it is required to support various frequency bandwidths in various frequency bands for the 5G mobile communication system, a cell coverage when a frequency band of several tens of GHz is used as a carrier frequency band may be much smaller than that in the conventional mobile communication system. Therefore, a method of expanding the cell coverage using a beamforming is being actively studied.

Meanwhile, in the case of using the beamforming, control signals and control channels such as synchronization signals transmitted to terminals in a cell are also transmitted by the base station in a beamforming manner. Particularly, since a wide band is divided into a plurality of bandwidth parts (BPs) and the control signals are transmitted through the plurality of BPs, there may arise a problem that terminals are concentrated in one or more specific BPs.

SUMMARY

Accordingly, embodiments of the present disclosure provide an operation method of a base station for balanced terminal assignment between bandwidth parts when multiple synchronization blocks are transmitted in a mobile communication system.

Accordingly, embodiments of the present disclosure also provide an operation method of a terminal for balanced terminal assignment between bandwidth parts when multiple synchronization blocks are transmitted in a mobile communication system.

Accordingly, embodiments of the present disclosure also provide a terminal for balanced terminal assignment between bandwidth parts when multiple synchronization blocks are transmitted in a mobile communication system.

In order to achieve the objective of the present disclosure, an operation method of a base station in a mobile communication system may comprise generating a first synchronization signal/physical broadcast channel (SS/PBCH) block including information indicating whether the first SS/PBCH block is allowed to be used for initial access of the terminal: and transmitting the generated SS/PBCH block in a first bandwidth part (BP).

The information may be included in a PBCH in the first SS/PBCH block.

The information may further indicate whether the first BP is allowed to be used for initial access of the terminal.

When the information indicates that the first SS/PBCH block is not allowed to be used for initial access of the terminal, the information may further include additional information, indicating a second SS/PBCH block allowed to be used for initial access of the terminal.

The additional information may indicate at least one of an offset between the first BP in which the first SS/PBCH block is transmitted and a second BP in which the second SS/PBCH block is transmitted, an offset between the first SS/PBCH block and the second SS/PBCH block, and an offset between a reference subcarrier and a subcarrier located in a lowest frequency resource among subcarriers to which the second SS/PBCH block is allocated when the reference subcarrier is set.

The first SS/PBCH block may further include an inter-frequency list including frequency bands supported by the base station and a redistribution factor for adjusting a movement probability between the frequency bands included in the inter-frequency list.

In order to achieve the objective of the present disclosure, an operation method of a terminal in a mobile communication system may comprise receiving a first synchronization signal/physical broadcast channel (SS/PBCH) block including information indicating whether the first SS/PBCH block is allowed to be used for initial access to a base station from the base station through a first bandwidth part (BP); and when the information indicates that the first SS/PBCH block is allowed to be used for the initial access to the base station, performing the initial access to the base station by using the received first SS/PBCH block.

The operation method may further comprise, when the information indicates that the first SS/PBCH block is not allowed to be used for initial access of the terminal, performing the initial access to the base station by using a second SS/PBCH block received in a second BP other than the first BP in which the first SS/PBCH block is received.

The information may be included in a PBCH in the first SS/PBCH block.

The information may further indicate whether the first BP is allowed to be used for initial access to the base station.

When the information indicates that the first SS/PBCH block received from the base station is not allowed to be used for initial access to the base station, the information may further include additional information indicating a second SS/PBCH block allowed to be used for initial access to the base station.

The additional information may indicate at least one of an offset between the first BP in which the first SS/PBCH block is transmitted and a second BP in which the second SS/PBCH block is transmitted, an offset between the first SS/PBCH block and the second SS/PBCH block, and an offset between a reference subcarrier and a subcarrier located in a lowest frequency resource among subcarriers to which the second SS/PBCH block is allocated when the reference subcarrier is set.

The first SS/PBCH block may further include an inter-frequency list including frequency bands supported by the base station and a redistribution factor for adjusting a movement probability between the frequency bands included in the inter-frequency list.

In order to achieve the objective of the present disclosure, a terminal in a mobile communication system may comprise a processor, a memory storing at least one instruction executed by the processor, and a transceiver controlled by the processor. The at least one instruction may be configured to receive a first synchronization signal/physical broadcast channel (SS/PBCH) block including information indicating whether the first SS/PBCH block is allowed to be used for initial access to a base station from the base station through a first bandwidth part (BP); and when the information indicates that the first SS/PBCH block is allowed to be used for the initial access to the base station, perform the initial access to the base station by using the received first SS/PBCH block.

The at least one instruction may be further configured to, when the information indicates that the first SS/PBCH block is not allowed to be used for initial access of the terminal, perform the initial access to the base station by using a second SS/PBCH block received in a second BP other than the first BP in which the first SS/PBCH block is received.

The information may be included in a PBCH in the first SS/PBCH block.

The information may further indicate whether the first BP is allowed to be used for initial access of the terminal.

When the information indicates that the first SS/PBCH block received from the base station is not allowed to be used for initial access to the base station, the information may further include additional information indicating a second SS/PBCH block allowed to be used for initial access to the base station.

The additional information may indicate at least one of an offset between the first BP in which the first SS/PBCH block is transmitted and a second BP in which the second SS/PBCH block is transmitted, an offset between the first SS/PBCH block and the second SS/PBCH block, and an offset between a reference subcarrier and a subcarrier located in a lowest frequency resource among subcarriers to which the second SS/PBCH block is allocated when the reference subcarrier is set.

The first SS/PBCH block may further include an inter-frequency list including frequency bands supported by the base station and a redistribution factor for adjusting a movement probability between the frequency bands included in the inter-frequency list.

According to the embodiments of the present disclosure, in the 5G mobile communication system transmitting multiple synchronization signals, efficient mobile communication system scheduling can be provided by allocating terminals in a balanced manner between the BPs.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
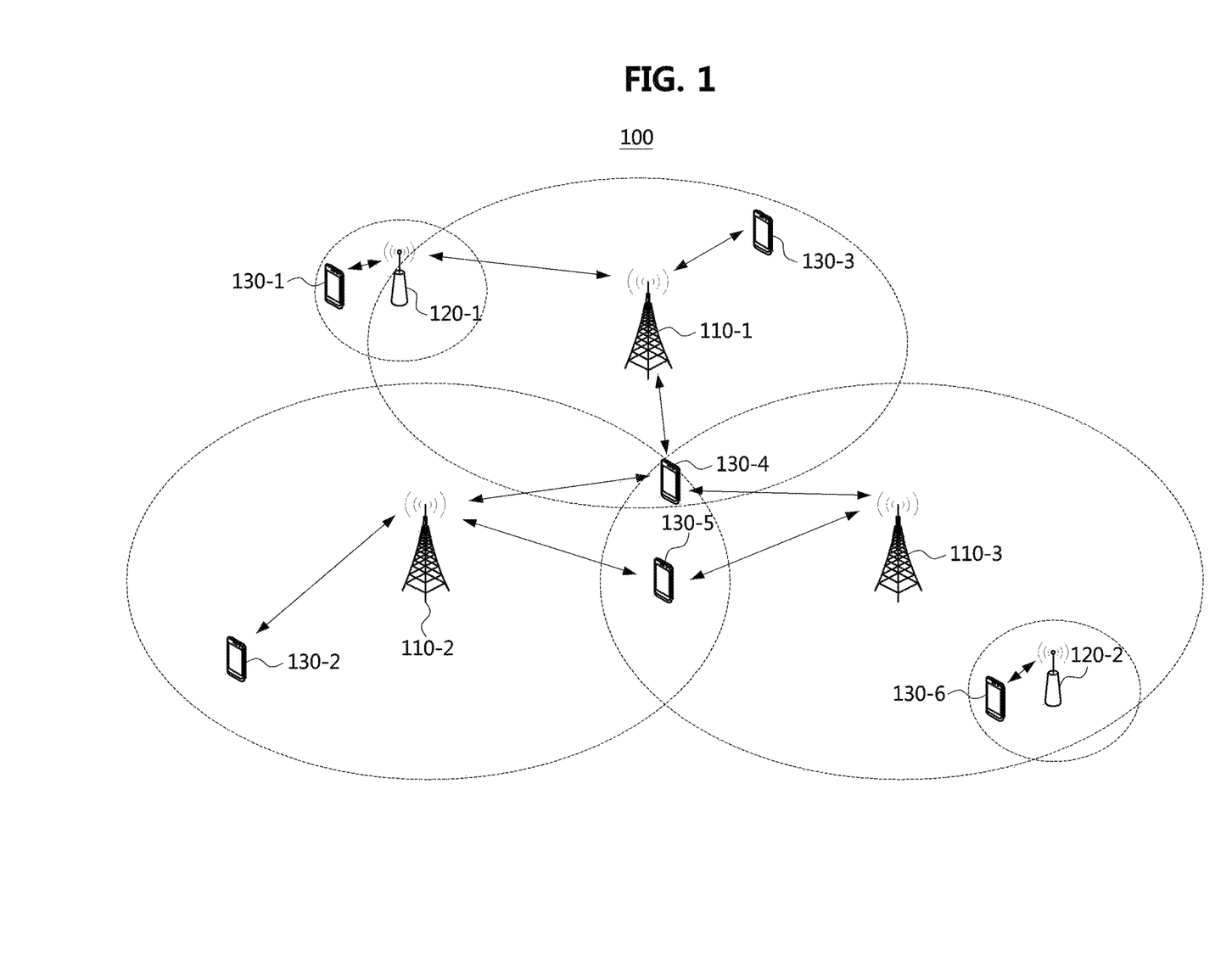
FIG. 1 is a conceptual diagram illustrating a mobile communication system according to a first embodiment of the present disclosure.

FIG. 1 is a conceptual diagram illustrating a mobile communication system according to a first embodiment of the present disclosure.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
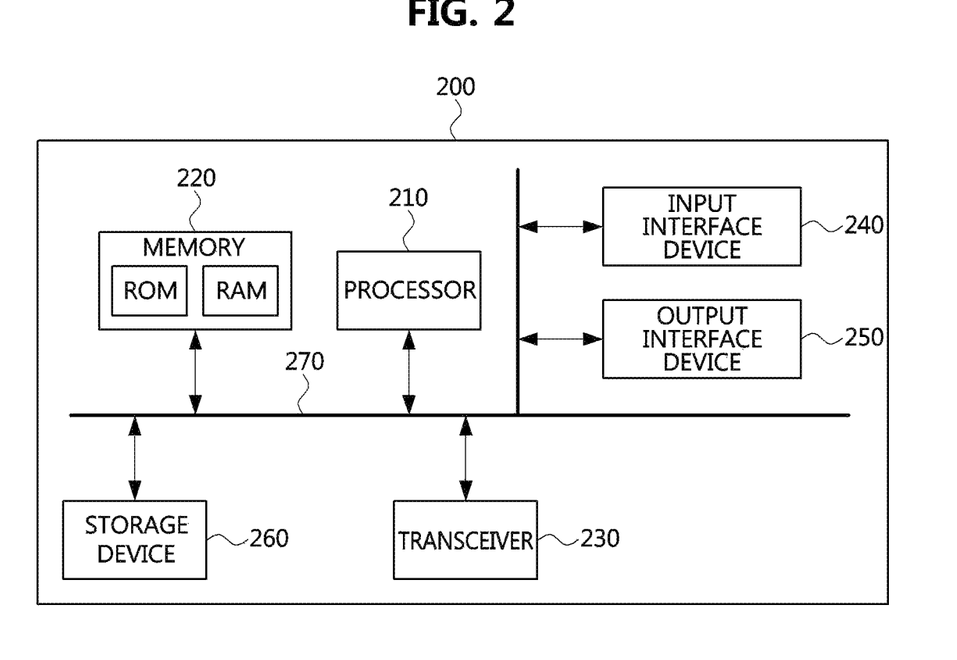
FIG. 2 is a block diagram illustrating a communication node in a mobile communication system according to a first embodiment of the present disclosure.

FIG. 2 is a block diagram illustrating a communication node in a mobile communication system according to a first embodiment of the present disclosure.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, techniques for multiple synchronization signal block transmission will be described. Here, even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station. Next, an initial access procedure to a mobile communication system, which is performed by a terminal, will be described.

Figure 3:
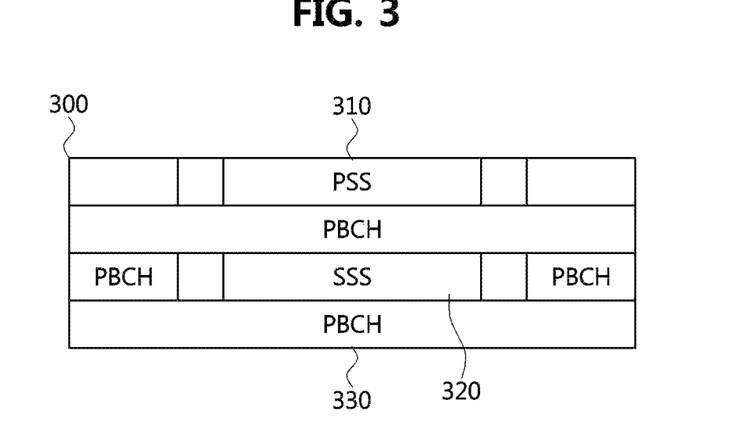
FIG. 3 is a conceptual diagram illustrating a synchronization signal block in a 5G new radio (NR) mobile communication system.

FIG. 3 is a conceptual diagram illustrating a synchronization signal block in a 5G new radio (NR) mobile communication system.

Referring to FIG. 3, a synchronization signal block (SSBk) 300 used in a 5G new radio (hereinafter referred to as 'NR') system, which is one of fifth generation mobile systems, may include a primary synchronization signal (PSS) 310, a secondary synchronization signal (SSS) 320, and a physical broadcast channel (PBCH) 330, and may be composed 4 OFDM symbols (the synchronization signal block may also be referred to as 'SS/PBCH'). Usually, when power is supplied to a terminal, a cell search for accessing an adjacent mobile communication system may be performed. The terminal may select one of searched cells. Through this process, the terminal may acquire frequency and symbol synchronization with the selected cell, and acquire radio frame synchronization with the selected cell. For the cell search and the cell selection of the terminal, the base station may transmit synchronization signals and broadcasting signals to all directions.

In the NR system, the base station may broadcast the SSBk 300 including the PSS 310, the SSS 320, and the PBCH 330 for this purpose. Specifically, the PSS 310, the SSS 320, and the PBCH 330 may be multiplexed in a time division multiplexing (TDM) manner, and the multiplexed PSS 310, SSS 320, and PBCH 330 may be transmitted using N (e.g., N=4; 1 PSS symbol, 1 PBCH symbol, 1 SSS symbol, and 1 PBCH symbol) OFDM symbols. Such the 4 OFDM symbols may be defined as a synchronization signal block (SSBk).

The PSS 310 may be used for the radio frame synchronization. The PSS 320 may be generated based on a Zadoff-Chu sequence (or, m-sequence) and may occupy 62 (or 127) subcarriers. The SSS may also be used for the radio frame synchronization. The SSS may be generated based on a gold sequence. The PBCH 330 may be used to transmit system information. The function of the PBCH in the NR system is similar to that in the conventional 3GPP LTE and LTE-A mobile communication systems. That is, the PBCH of the NR may be used to transmit system information including a master information block (MIB).

The system information such the MIB may include information on a system frame number (SFN), front-loaded DMRS position information, and numerology information for data reception. When the terminal receives the system information, the terminal may perform a random access (RA) procedure with the base station. Accordingly, the terminal may establish a radio link connection with the NR mobile communication system. Next, radio resource control (RRC) states and RRC state transitions of the terminal having completed the RA procedure will be described.

Figure 4:
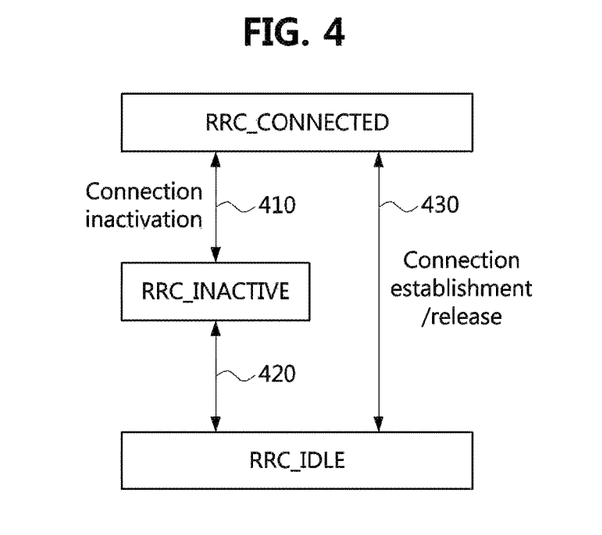
FIG. 4 is a conceptual diagram for explaining RRC states and RRC state transitions in a 5G NR mobile communication system.

FIG. 4 is a conceptual diagram for explaining RRC states and RRC state transitions in a 5G NR mobile communication system.

Referring to FIG. 4, RRC state transitions including an RRC_INACTIVE state that did not exist as the RRC states in the conventional 3GPP LTE and LTE-A mobile communication systems are illustrated. The RRC_INACTIVE state may be an RRC state introduced to efficiently manage a massive machine type communication (mMTC) terminal.

The RRC_INACTIVE state may be similar to the RRC idle state (RRC_IDLE) state, which has been added to reduce the power consumption of the mMTC terminal in the RRC state transitions. However, the RRC_INACTIVE state may make it possible to minimize the power consumption of the terminal by minimizing control procedures when the mMTC terminal transitions from the state (i.e., the RRC_INACTIVE state) other than the RRC_CONNECTED state to the RRC_CONNECTED state. For this, a connection state between the mMTC terminal in the RRC_INACTIVE state and the mobile communication system may be maintained similar to the RRC_CONNECTED state.

That is, in the case of a non-mMTC terminal in the NR system, a transition procedure 430 between the RRC_IDLE state and the RRC_CONNECTED state may be performed as in the 3GPP LTE and LTE-A systems. Also, the mMTC terminal may perform a transition procedure 410 between the RRC_INACTIVE state and the RRC_CONNECTED state and a transition procedure 420 between the RRC_INACTIVE state to the RRC_IDLE state.

Meanwhile, as described above, the NR system is expected to be implemented to enable system operations not only in the conventional radio frequency band but also in a high frequency band. In general, however, a propagation loss such as a path-loss and a reflection loss is relatively large in comparison with a low frequency band because diffraction characteristics and reflection characteristics of radio waves are not good in the high frequency band.

Therefore, when a mobile communication system is implemented in the frequency band of several tens GHz, which is much higher than that of the conventional mobile communication system of several GHz band, cell coverage may be reduced compared to the conventional case. In order to solve this problem, a method of increasing the cell coverage through a beamforming utilizing a plurality of antenna elements in the high frequency band has been being studied. However, in this case, unlike the conventional case, there may be a problem that the terminal may not smoothly receive synchronization signals transmitted over a wide band. Next, synchronization signal transmission in the case where beamforming according to the prior art is applied will be described.

Figure 5:
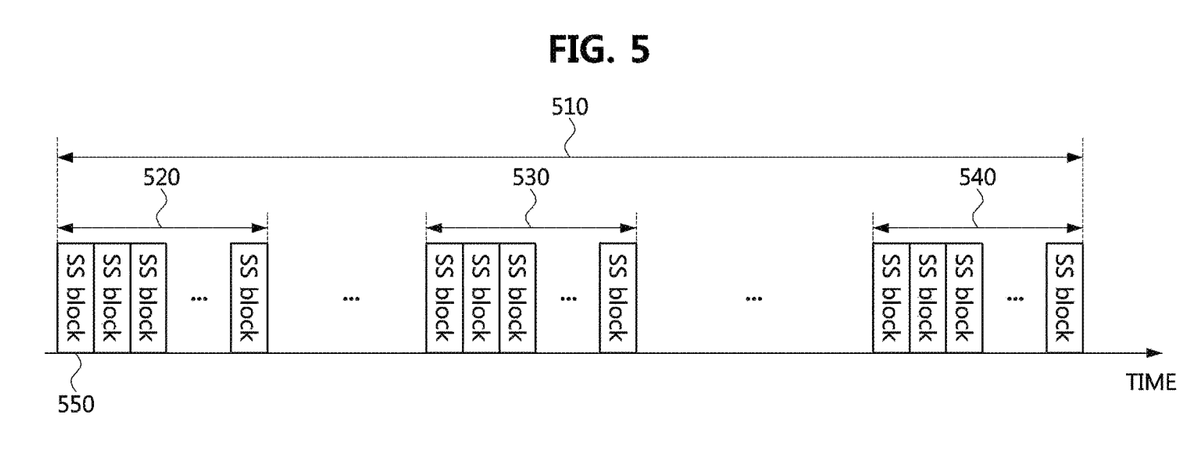
FIG. 5 is a conceptual diagram for explaining a synchronization signal block transmission method in a 5G NR mobile communication system.

FIG. 5 is a conceptual diagram for explaining a synchronization signal block transmission method in a 5G NR mobile communication system.

Referring to FIG. 5, a synchronization signal burst set (SSBS) 510 may be a set of synchronization signal bursts (SSB) 520, 530 and 540 each of which consists of synchronization signal blocks 550. Here, the synchronization signal may include the PSS and the SSS.

As described above, the fifth generation mobile communication system is expected to be implemented to support operations in a wide range of frequency bands ranging from several hundred MHz to tens of GHz, with use of various OFDM subcarrier spacings. In order to solve the problem of reducing the cell coverage, a method of increasing the cell coverage by using beamforming schemes in the high frequency band has been studied.

Such the beamforming schemes may include an analog beamforming scheme and a digital beamforming scheme. The digital beamforming scheme may obtain a beamforming gain by using a plurality of radio frequency (RF) paths based on multiple input multiple output (MIMO) antennas and a digital precoder or a codebook. Since the digital beamforming method requires a digital-to-analog converter (DAC) or an analog-to-digital converter (ADC) and requires the same number of transceiver units (TXRUs) as antenna elements, increase of the beamforming gain proportionally increases the complexity of the antenna implementation as well.

The analog beamforming scheme may achieve a beamforming gain through a number of antenna arrays and analog devices such as phase shifters, power amplifiers (PAs), variable gain amplifiers (VGAs), and the like. In the analog beamforming scheme, since a plurality of antenna elements are connected to a single transceiver unit through phase shifters, even when the number of antenna elements is increased in order to increase the beamforming gain, the resulting complexity is not greatly increased. However, the performance of the analog beamforming scheme is lower than that of the digital beamforming scheme, and the frequency resource utilization efficiency is limited because the phase shifters are controlled in time domain.

In the case that the cell coverage is increased through the beamforming, not only dedicated control channels and dedicated data for each terminal in the cell but also common control channels and common signals for all terminals in the cell may be also transmitted in the beamforming manner. However, in this case, since common signals including the common control channel and the synchronization signal cannot be transmitted to all the regions in the cell through a single transmission, the common signals may be transmitted through a plurality of beams over a plurality of times for a predetermined time (this operation may be referred to as a 'beam sweeping').

A terminal attempting to access a mobile communication system may acquire downlink frequency/time synchronization and acquire cell ID information through the synchronization signal, and acquire uplink and downlink synchronization and establish a radio link with a base station through a RA procedure. When a plurality of SSBks 550 are transmitted through a beamforming, the beam sweeping operation is required in which a plurality of beams are transmitted while being switched. For this, a plurality of SSBs 520, 530 and 540 (referred to as 'multi-SSB') may be allocated within a transmission period of the synchronization signal and the PBCH, and the SSBS 510 may be composed of the plurality of allocated SSBs.

The maximum number of SSBks constituting one SSBS 510, and the number and positions of actually-transmitted SSBks may vary depending on the mobile communication system, and the maximum number of the SSBks in the SSBS 510 may vary depending on the frequency band of the mobile communication system. For example, one SSBS may have up to 4 SSBks sin the band below 3 GHz, up to 8 SSBks in the band of 3 to 6 GHz, and up to 64 SSBks in the band above 6 GHz. As described above, one SSB may include the synchronization signals and the PBCH multiplexed in the TDM manner, and the terminal may explicitly or implicitly identify an SSB index, an OFDM symbol index, a slot index, or the like from the received PBCH.

Meanwhile, the fifth generation mobile communication system may support a system frequency bandwidth of several hundreds of MHz (e.g., 400 MHz) as described above, whereas a frequency bandwidth supported by the terminal may be different. That is, the terminal may support the entire frequency bandwidth or only a part of the frequency bandwidth according to the capability of the terminal. In order to support smooth access to the mobile communication system of the terminals having various frequency bandwidth processing capabilities, the SSBks including the synchronization signal and the PBCH may be transmitted as allocated in a plurality of positions on a frequency axis. The synchronization signal and the PBCH are allocated and transmitted in the middle of the frequency bandwidth of the conventional mobile communication system. Next, a method of transmitting SSBks through each component carrier in carrier aggregation (CA) will be described.

Figure 6:
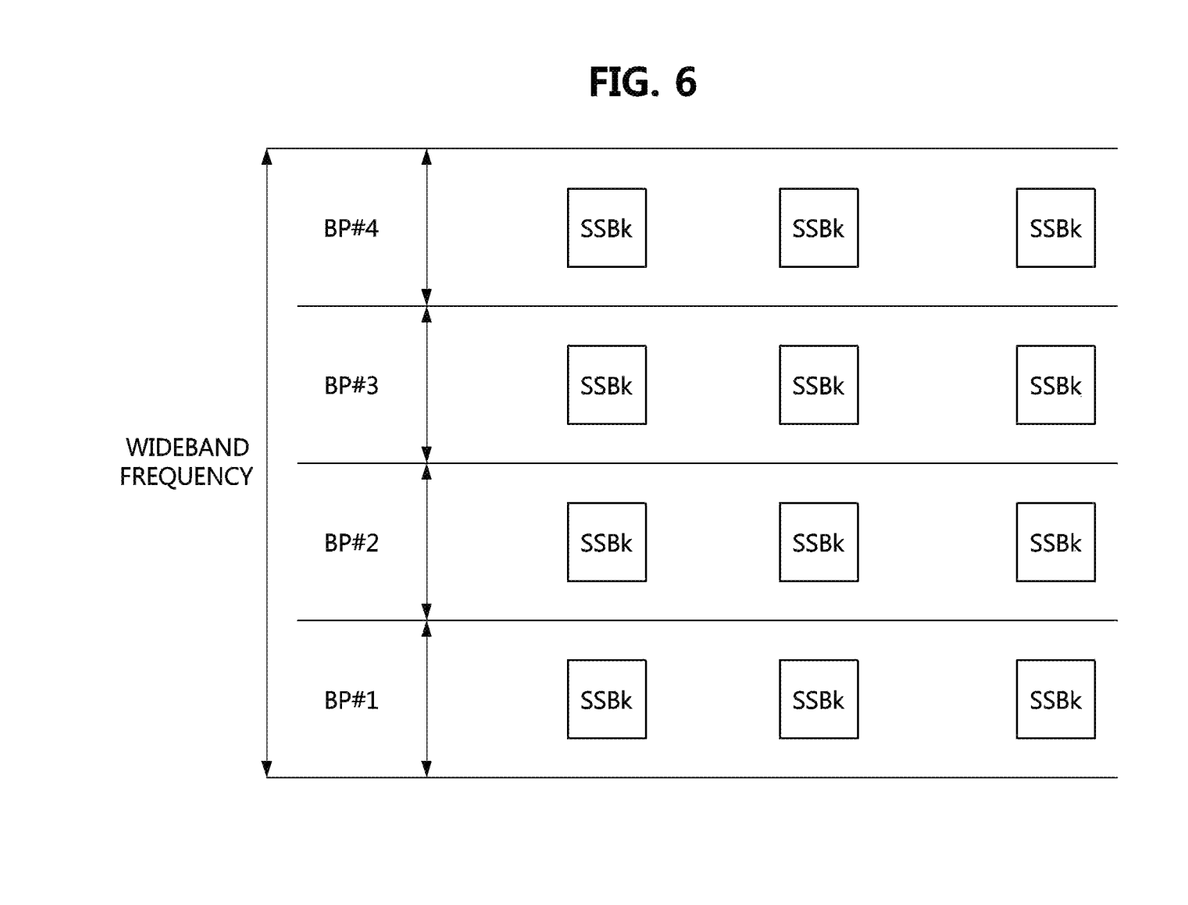
FIG. 6 is a conceptual diagram for explaining a method of transmitting synchronization signal blocks in a carrier aggregation technique in a 5G NR mobile communication system.

FIG. 6 is a conceptual diagram for explaining a method of transmitting synchronization signal blocks in a carrier aggregation technique in a 5G NR mobile communication system.

Referring to FIG. 6, when a CA technique is applied, each component carrier (CC) band may be divided into a plurality of bandwidth parts (BPs), and SSBks may be transmitted as allocated to each divided BP.

With the CA technique, multiple CCs each of which has a bandwidth of up to 20 MHz (or 100 MHz) may be used simultaneously for the radio link to the same terminal, thus enabling the use of wider bandwidth and the implementation of higher link data rate. In the 3GPP LTE and LTE-A mobile communication systems, up to five CCs each of which has a bandwidth of up to 20 MHz can be aggregated, and thus a bandwidth of up to 100 MHz can be supported.

However, even the terminal supporting CA may not support the maximum bandwidth and may support only a part of the bandwidth. Thus, the base station may allocate a plurality of SSBks to each of a plurality of CCs so that the terminal can receive one of the plurality of SSBks and perform an initial access procedure based on the received SSBk, even when the terminal attempts to establish a radio link with the base station through any CC of the plurality of CCs. That is, the terminal may receive one of the SSBks transmitted through the BP and perform the initial access to the base station. In the above-described manner, the terminal supporting a wide bandwidth may monitor all SSBks transmitted in the entire system frequency band, and the terminal supporting a part of the bandwidth may monitor at least one SSBk transmitted through one or more BPs.

Meanwhile, as power is supplied in a state that a terminal is turned off, the terminal attempting to access a mobile communication system initially may not have information on a system bandwidth of the mobile communication system. Therefore, the terminal may perform initial access based on one of SSBks transmitted through multiple BPs regardless of the supported bandwidth. In this case, terminals attempting initial access may be concentrated on a specific BP, which may cause a problem in scheduling, load balancing, or the like of the mobile communication system.

In order to prevent such the problem, in the mobile communication system in which the entire system frequency bandwidth is divided into BPs, terminals (particularly, terminals supporting a small bandwidth) are required to be distributed evenly over the entire system frequency band to establish their radio links. Next, a BP switching method according to an embodiment of the present disclosure for distributing terminals evenly over BPs on a system frequency band will be described.

Figure 7:
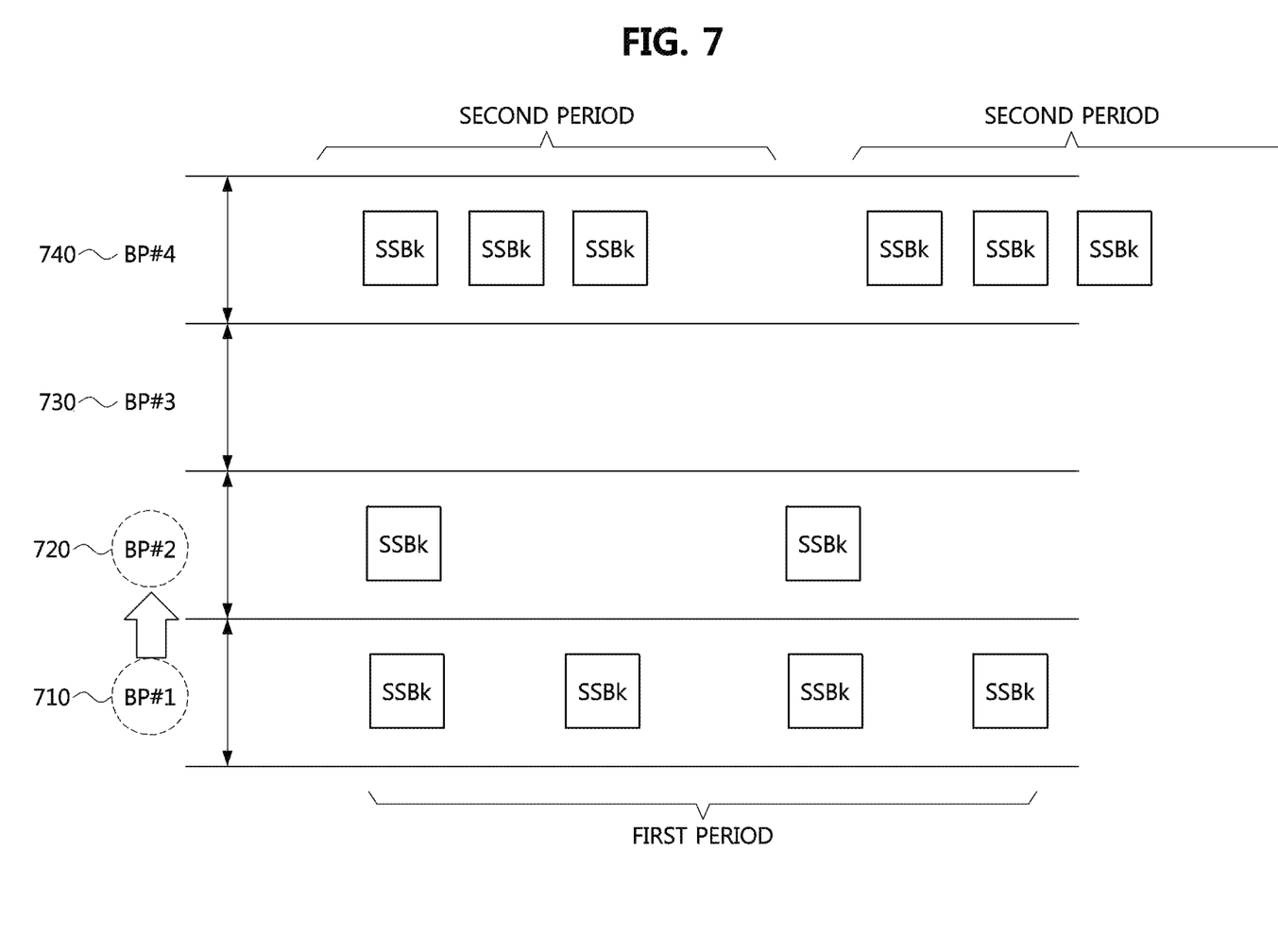
FIG. 7 is a conceptual diagram illustrating a BP switching method according to an embodiment of the present disclosure.

FIG. 7 is a conceptual diagram illustrating a BP switching method according to an embodiment of the present disclosure.

Referring to FIG. 7, a terminal connected to a specific BP (e.g. BP #1) may be switched to another BP (e.g. BP #2). In the case that a terminal initially accessing (or, establishing a radio link with) a mobile communication system acquires uplink synchronization through completion of the RA procedure and transitions to the RRC_CONNECTED state, a base station may switch a BP of the terminal to another BP through a terminal-specific RRC signaling. For example, as shown in FIG. 7, the terminal of BP #1 may be switched to another BP, i.e., BP #2, but is not limited thereto.

The terminal that has been instructed to switch to another BP through the terminal-specific RRC signaling may switch to the target BP using information on SSBk transmissions in the target BP. Also, configuration information of the SSBk transmissions in the target BP, configuration status of the entire BPs in the mobile communication system, and information on the SSBk transmissions in each BP may be transferred to the terminal via the terminal-specific RRC signaling or the system information (e.g., a PBCH or a physical downlink shared channel (PDSCH) carrying remaining minimum system information (RMSI)), and the terminal may use the information to perform the BP switching when instructed to perform the BP switching. Alternatively, the terminal itself may determine terminal assignment statuses for the respective BPs, and may perform the BP switching by requesting the BP switching to the base station and receiving the approval in response to the requesting.

The BP switching may be instructed to the terminals, which are in the RRC_CONNECTED state after completion of the RA procedure, through the terminal-specific RRC signaling. The terminals remaining in the RRC_IDLE state in the corresponding BP without performing the RA procedure after accessing the mobile communication system may also be evenly distributed among the BPs so as not to concentrate on the specific BP as described later.

Meanwhile, the allocation and transmission of SSBks in each BP according to an embodiment of the present disclosure may be performed in various manners according to the situation of the mobile communication system, not fixed in one method. For example, as shown in the embodiment of FIG. 7, SSBks may be transmitted while maintaining the same pattern and the same periodicity in an entire BP (e.g. BP #1 710), or only a part of the SSBKs may be transmitted in a specific BP (e.g., BP #2 720).

In this case, the terminal may know information on the actually-transmitted SSBks and the non-transmitted SSBks through the above-described terminal-specific RRC signaling or system information. Specifically, the terminal may know whether initial access to the base station is allowed through an SSBk (e.g., first SSBk) by using information included in a system information transfer channel such as the PBCH in the SSBk. That is, information indicating whether or not initial access to the base station is allowed through the SSBk (e.g., first SSBk) may be included in the PBCH of the SSBk (e.g., first SSBk). For example, whether or not the initial access is allowed may be indicated by information having a flag form. In this case, the information may indicate whether the BP (e.g., first BP) in which the SSBk (e.g., first SSBk) is transmitted is allowed to be used for initial access to the base station.

On the other hand, when initial access to the base station is not allowed through the SSBk (e.g., first SSBk), additional information indicating an SSBk (e.g., second SSBk) allowed to be used for initial access to the base station may be included in the SSBk (e.g., first SSBk).

In this case, the additional information may be an offset corresponding to a difference between the BP (i.e., first BP) through which the SSBk (i.e., first SSBk) currently received by the terminal is transmitted and a BP (i.e., second BP) through which the terminal is allowed to perform initial access to the base station. Alternatively, the additional information may be an offset corresponding to a difference (e.g., difference between SSBk indexes) between the SSBk (i.e., first SSBk) currently received by the terminal and the SSBk (i.e., second SSBk) allowed to be used for initial access to the base station.

On the other hand, depending on the system configuration, the terminal may interpret that an SSBk through which the terminal is allowed to perform initial access to the base station is transmitted in a BP other than the BP indicated by the offset corresponding to the difference between the first BP and the second BP. Also, depending on the system configuration, the terminal may interpret the terminal is allowed to perform initial access to the base station by using an SSBk other than the SSBk indicated by the offset corresponding to the difference between the first SSBk and the second SSBk.

In addition, when a reference subcarrier is configured, the additional information may be an offset between the reference subcarrier and a subcarrier located in the lowest frequency resource among subcarriers allocated to the second SS/PBCH block (SSBk).

Meanwhile, the base station may not transmit any SSBk in a specific BP (e.g., BP #3 730), and may allocate and transmit SSBks while changing the SSBk transmission periodicity in a specific BP (e.g., BP #4 740). Next, a method of uniformly distributing RRC_IDLE state terminals among BPs according to an embodiment of the present disclosure will be described.

Figure 8:
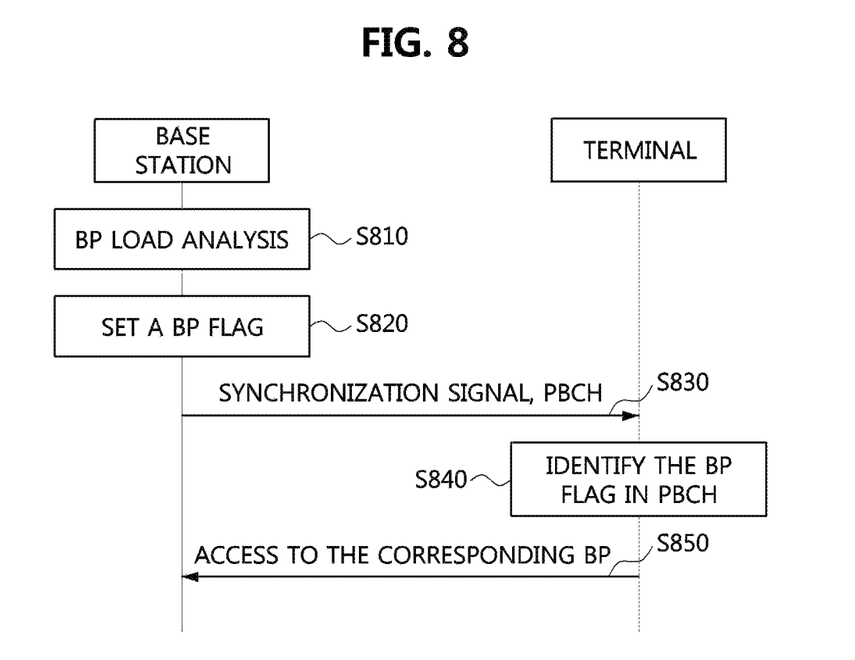
FIG. 8 is a sequence chart illustrating a BP selection and switching method of a terminal using a PBCH flag according to an embodiment of the present disclosure.

FIG. 8 is a sequence chart illustrating a BP selection and switching method of a terminal using a PBCH flag according to an embodiment of the present disclosure.

Referring to FIG. 8, a procedure of identifying at least one of available BPs and SSBks using the BP flag information in the PBCH by the terminal attempting to initially access the mobile communication system is illustrated. In the 3GPP LTE and LTE-A mobile communication systems, load balancing between CCs is performed using a paging channel when the plurality of CCs are used.

Specifically, when a base station determines that load balancing is required between the CCs, the base station may transfer an inter-frequency list, redistribution factors, and the like to the terminal through system information. Then, when the base station instructs the terminal in the RRC_IDLE state to perform a redistribution procedure, the terminal in the RRC_IDLE state receiving the instruction may perform a CC redistribution procedure. Here, the inter-frequency list may represent one or more frequency bands supported by the base station. The redistribution factors may include a degree of congestion (e.g., channel busy ratio (CBR)) of each of the one or more frequency bands (or BPs) indicated by the inter-frequency list or a factor of adjusting a movement probability in the inter-frequency list.

Through the CC redistribution procedure, the terminals in the RRC_IDLE state may measure channel states of cells in the received inter-frequency list and select N cells having an excellent channel state. Then, the terminals in the RRC_IDLE state may select, among the N cells, an optimal cell derived from an equation considering the redistribution factors, identifiers of the terminals, and the like, which are obtained through the system information. This may be different from cell reselection in which a cell having the best downlink channel state is selected by periodically measuring the downlink channel state among inter-frequencies.

Such the method may be applied to all the RRC_IDLE terminals simultaneously. However, since the terminal performs the cell reselection based on the information (inter-frequency list and redistribution factors) given to the terminals in the RRC_IDLE state and the downlink channel state measurements on the cells in the inter-frequency list, the mobile communication system may not be load-balanced in a desired manner. Also, it may take a long time for the terminal in the RRC_IDLE state receiving a paging channel to perform the downlink channel state measurement and redistribution.

The above-described method may not be suitable for load balancing between BPs in the case of using a wideband CC in the fifth generation mobile communication system. Therefore, in the embodiment of the present disclosure illustrated in FIG. 7, in order to ensure that the terminals in the RRC_IDLE state are not concentrated on a specific BP, the terminals are allocated in a balanced manner among the BPs by using the BP flag information of the PBCHs transmitted in the BPs. As described above, the terminal attempting initial access to the mobile communication system may receive a synchronization signal and a PBCH in a BP, and attempt to access the mobile communication system through the BP. As described above, the mobile communication system may divide a broadband CC into two or more BPs in advance, and allocate a synchronization signal block including synchronization signals and PBCHs for each divided BP.

In advance, the mobile communication system may perform load analysis for load balancing between BPs (S810). The mobile communication system may determine whether or not each BP is allowed to be used (whether or not each BP is accessible) by determining loads of the BPs through the load analysis, and may set a BP flag indicating availability of each BP as determined (S820). For example, as will be described later, a BP flag may be activated (ON) for a BP allowed to be used, and the BP flag may be inactivated (OFF) for a BP that is not allowed to be used. Alternatively, a BP flag may indicate only whether access to the corresponding BP is not allowed.

The base station may transmit SSBks including the synchronization signal and the PBCH for each BP (S830).

As described above, the SSBks transmitted for each BP may be changed in various manners in addition to a fixed pattern and period. The terminal desiring initial access to the mobile communication system may receive the SSBk from a BP preferentially selected among the BPs of the base station and check the BP flag in the PBCH (S840). When the terminal determines based on the BP flag that the selected BP is allowed to be used, the terminal may perform a radio link access to the corresponding BP (S850). On the other hand, when the terminal determines based on the BP flag that the selected BP is not allowed to be used, the terminal may receive the SSBk from the corresponding BP and identify the BP flag of the corresponding BP in order to attempt a radio link access to the next BP. Meanwhile, if initial access to the base station is not allowed through one SSBk (e.g., first SSBk), additional information indicating another SSBk (e.g., second SSBk) allowed to be used for initial access to the base station may be included in the one SSBk (i.e., first SSBk).

In this case, the additional information may be an offset corresponding to a difference between the BP (i.e., first BP) through which the SSBk (i.e., first SSBk) currently received by the terminal is transmitted and a BP (i.e., second BP) through which the terminal is able to perform initial access to the base station. Alternatively, the additional information may be an offset corresponding to a difference (e.g., difference between SSBk indexes) between the SSBk (i.e., first SSBk) currently received by the terminal and the SSBk (i.e., second SSBk) allowed to be used for initial access to the base station.

On the other hand, depending on the system configuration, the terminal may interpret that an SSBk through which the terminal is allowed to perform initial access to the base station is transmitted in a BP other than the BP indicated by the offset corresponding to the difference between the first BP and the second BP. Also, depending on the system configuration, the terminal may interpret the terminal is allowed to perform initial access to the base station by using an SSBk other than the SSBk indicated by the offset corresponding to the difference between the first SSBk and the second SSBk.

In addition, when a reference subcarrier is configured, the additional information may be an offset between the reference subcarrier and a subcarrier located in the lowest frequency resource among subcarriers allocated to the second SS/PBCH block (SSBk).

In addition to the initial access to the mobile communication system, when a lot of radio links have already been established by a plurality of terminals in a specific BP, load balancing may be performed. In the case that there are the terminals connected to the specific BP by establishing a lot of radio links, the base station may prevent accesses of additional terminals to the corresponding BP. For this, a BP flag in the SSBk of the corresponding BP may be inactivated. At this time, since the SSBk may be periodically monitored also by the terminal that has already established a radio link in the specific BP, when the state of the BP flag in the received PBCH is inactivated, the terminal may determine that it is impossible to maintain the radio link in the corresponding BP.

This may lead to unnecessary searching for another BP's SSBk for switching to another BP. Therefore, in order to prevent this, the terminal that has already established a radio link in the specific BP may be configured to ignore the BP flag of the PBCH through a terminal-specific RRC signaling or system information. Next, a BP access restriction method using a BP flag according to an embodiment of the present disclosure will be described.

Figure 9:
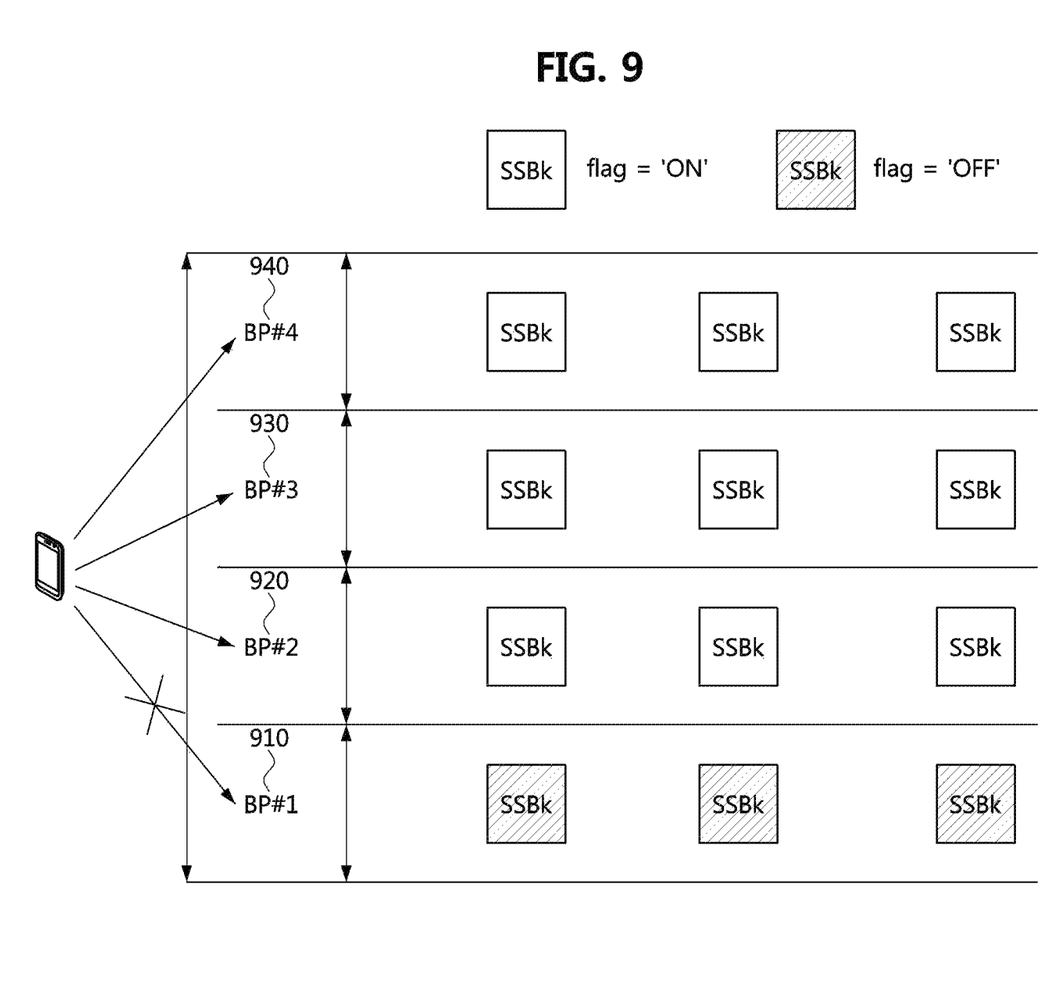
FIG. 9 is a sequence chart illustrating a BP selection and switching method of a terminal using a PBCH flag according to another embodiment of the present disclosure.

FIG. 9 is a sequence chart illustrating a BP selection and switching method of a terminal using a PBCH flag according to another embodiment of the present disclosure.

Referring to FIG. 9, a terminal attempting initial access may sequentially receive PBCHs of SSBks of available BPs, and identify a BP flag indicating whether each BP is allowed to be used for the initial access. As described above, the terminal may know whether initial access to the base station is allowed by using the SSBk received by the terminal through the system information transfer channel (PBCH). That is, the flag-type information indicating whether or not the terminal is allowed to perform initial access to the base station may be received through the SSBk as included in the PBCH of the SSBk.

On the other hand, when initial access to the base station is not allowed through one SSBk (e.g., first SSBk), additional information indicating another SSBk (e.g., second SSBk) allowed to be used for initial access to the base station may be included in the one SSBk (e.g., first SSBk).

In this case, the additional information may be an offset corresponding to a difference between the BP (i.e., first BP) through which the SSBk (i.e., first SSBk) currently received by the terminal is transmitted and a BP (i.e., second BP) through which the terminal is allowed to perform initial access to the base station. Alternatively, the additional information may be an offset corresponding to a difference (e.g., difference between SSBk indexes) between the SSBk (i.e., first SSBk) currently received by the terminal and the SSBk (i.e., second SSBk) allowed to be used for initial access to the base station.

On the other hand, depending on the system configuration, the terminal may interpret that an SSBk through which the terminal is allowed to perform initial access to the base station is transmitted in a BP other than the BP indicated by the offset corresponding to the difference between the first BP and the second BP. Also, depending on the system configuration, the terminal may interpret the terminal is allowed to perform initial access to the base station by using an SSBk other than the SSBk indicated by the offset corresponding to the difference between the first SSBk and the second SSBk.

In addition, when a reference subcarrier is configured, the additional information may be an offset between the reference subcarrier and a subcarrier located in the lowest frequency resource among subcarriers allocated to the second SS/PBCH block (SSBk).

In FIG. 9, a case in which the BP flag of a BP #1 (i.e., 910) is inactivated (OFF), and other BP flags of BPs #2, #3, and #4 (i.e., 820, 830, and 840) are activated (ON) is illustrated.

Therefore, the terminal may attempt to access the remaining BPs (i.e., BP #2, BP #3, and BP #4) except for the BP #1.

Meanwhile, in the fifth generation mobile communication system, some of the system information may not be always broadcast periodically for efficient use of radio resources and forward compatibility, and may be transmitted only when requested by the terminal. Next, a system information transmission method based on a terminal request using a random access channel (RACH) will be described.

Figure 10:
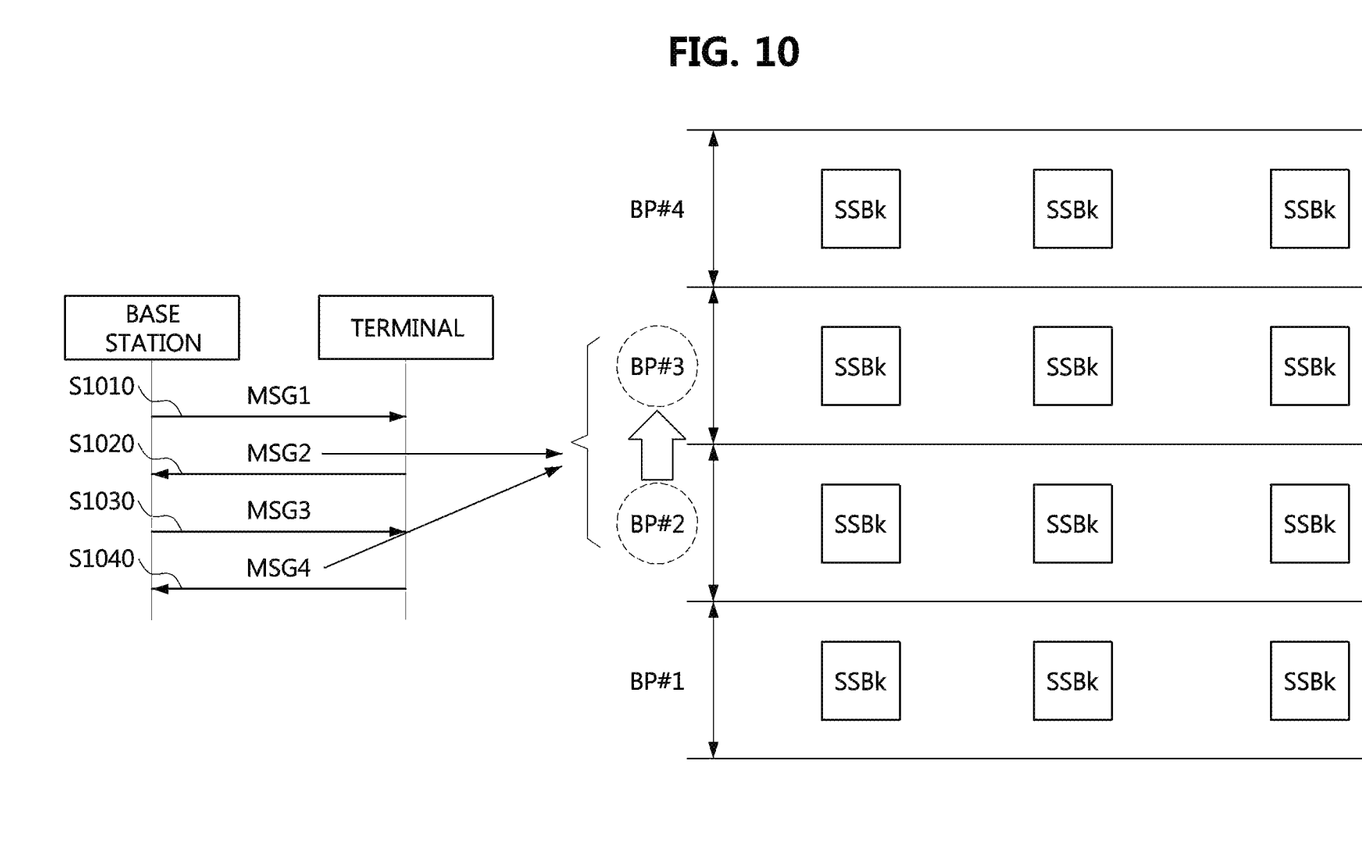
FIG. 10 is a conceptual diagram illustrating a system information transmission method based on a terminal request according to an embodiment of the present invention.

FIG. 10 is a conceptual diagram illustrating a system information transmission method based on a terminal request according to an embodiment of the present invention.

Referring to FIG. 10, in a RA procedure, a terminal and a base station may transmit and receive messages MSG1 to MSG4 and perform related procedures. The terminal attempting RA to the base station may transmit a RACH REQUEST via a PRACH preamble (i.e., MSG1) to the base station (S1010). The base station may transmit a RACH RESPONSE to the terminal via the MSG2 (S1020). Then, the terminal may transmit a UE IDENTIFICATION MESSAGE to the base station via the MSG3 (S1030). At this time, an RRC connection request may also be transmitted together. The base station may then transmit a CONTENTION RESOLUTION MESSAGE to the terminal via the MSG4 (S1040). At the same time, an RRC connection setup may be transmitted through a signaling radio bearer 0 (SRB0).

As described above, in the 5th generation mobile communication system, the terminal may request transmission of system information according to its demand. That is, in the case of some system information (Other System Information), it may be transmitted only when there is a request of the terminal. For example, the terminal may request the transmission of the system information via the MSG1 or the MSG3 during the RA procedure, and the base station may respond to the request via the MSG2 or the MSG4.

In the system information transmission method based on the terminal request according to an embodiment of the present disclosure shown in FIG. 10, the base station may instruct the terminal in the RRC_IDLE state or the RRC_CONNECTED state to be switched (offloading) to another BP via the MSG2 or the MSG4. At this time, the MSG2 or the MSG4 may inform not only whether or not to switch to another BP, but also a specific BP to which the terminal is instructed to switch. For example, in the embodiment of FIG. 10, the terminal is instructed to switch from the BP #2 to the BP #3. For this, the terminal may be required to have information related to a plurality of SSBk transmissions transmitted over a wide band through system information (minimum system information or remaining minimum system information) broadcasted in advance periodically. The terminal may request system information to the previous BP (i.e., BP #2), and the requested system information may be received from the new BP (i.e., BP #3). Alternatively, the terminal may switch to the new BP after the system information requested to the previous BP is received from the previous BP.

Meanwhile, as a radio access waveform technology for the 5G mobile communication system, orthogonal frequency division multiplexing (OFDM), filtered OFDM, generalized frequency division multiplexing (GFDM), filter bank multi-carrier (FBMC), universal filtered multi-carrier (UFMC), and the like are discussed as candidate technologies. Among these, OFDM based on cyclic prefix (CP) and single carrier-frequency division multiple access (SC-FDMA) may still be considered as a priority due to a low complexity in implementation of a transceiving end and an ease of multiple-input multiple-output (MIMO) implementation.

Alternatively, in order to flexibly support various 5G mobile communication system utilization scenarios, the filtered OFDM or the GFDM, which is able to simultaneously accommodate different waveform parameters in a single carrier without a guard band, and has a frequency spectrum with a small out-band emission (OOB), may also be considered. In general, the CP-based OFDM may also include spread spectrum OFDM technologies such as the Filtered OFDM and DFT-spread OFDM. In the present invention, the CP-based OFDM is assumed as the radio access waveform technology, but this is merely for convenience of description, and the scope of claims of the present disclosure is not limited to the specific waveform technology.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal for initial access to a base station, in a communication system, the operation method comprising:
    receiving a first synchronization signal/physical broadcast channel (SS/PBCH) block from the base station;
    determining whether the first SS/PBCH block is to be used for initial access to receive system information based on first information included in the first SS/PBCH block; and
    in response to determination that the first SS/PBCH block is not to be used for initial access of the terminal, receiving a second SS/PBCH block indicated by second information included in the first SS/PBCH block, and performing initial access to the base station using the second SS/PBCH block,
    wherein the second information is an offset between the first SS/PBCH block and the second SS/PBCH block.

2. The operation method according to claim 1, wherein the first information and the second information are included in a PBCH of the first SS/PBCH block.

3. The operation method according to claim 1, wherein the first information is in form of a flag.

4. The operation method according to claim 1, further comprising, in response to determination that the first SS/PBCH block is to be used for initial access of the terminal, performing initial access to the base station using the first SS/PBCH block.

5. An operation method of a terminal for initial access to a base station, in a communication system, the operation method comprising:
    receiving a first synchronization signal/physical broadcast channel (SS/PBCH) block from the base station at a first frequency;
    determining whether the first SS/PBCH block is to be used for initial access to receive system information based on first information included in the first SS/PBCH block; and
    in response to determination that the first SS/PBCH block is not to be used for initial access of the terminal, receiving a second SS/PBCH block indicated by second information included in the first SS/PBCH block, and performing initial access to the base station using the second SS/PBCH block,
    wherein the second SS/PBCH block is received from the base station at a second frequency, the second frequency being different from the first frequency.

6. An operation method of a base station for initial access of a terminal, in a communication system, the operation method comprising:
    transmitting a first synchronization signal/physical broadcast channel (SS/PBCH) block to a terminal, the first SS/PBCH block including first information indicating whether the first SS/PBCH block is to be used for initial access to receive system information;
    transmitting a second SS/PBCH block to the terminal, the second SS/PBCH block being indicated by second information included in the first SS/PBCH block; and
    when the first SS/PBCH block is to be used for initial access of the terminal, performing an initial access procedure with the terminal using the second SS/PBCH block to be used for initial access of the terminal,
    wherein the second information is an offset between the first SS/PBCH block and the second SS/PBCH block.

7. The operation method according to claim 6, wherein the first information and the second information are included in a PBCH of the first SS/PBCH block.

8. The operation method according to claim 6, wherein the first information is in form of a flag.

9. The operation method according to claim 6, further comprising, when the first SS/PBCH block is to be used for initial access of the terminal, performing an initial access procedure with the terminal using the first SS/PBCH block.

10. An operation method of a base station for initial access of a terminal, in a communication system, the operation method comprising:
    transmitting a first synchronization signal/physical broadcast channel (SS/PBCH) block to a terminal at a first frequency, the first SS/PBCH block including first information indicating whether the first SS/PBCH block is to be used for initial access to receive system information;
    transmitting a second SS/PBCH block to the terminal, the second SS/PBCH block being indicated by second information included in the first SS/PBCH block; and
    when the first SS/PBCH block is to be used for initial access of the terminal, performing an initial access procedure with the terminal using the second SS/PBCH block to be used for initial access of the terminal, wherein the second SS/PBCH block is transmitted to the terminal at a second frequency, the second frequency being different from the first frequency.

* * * * *